(12) United States Patent  
Yamakami et al.

(10) Patent No.: US 8,861,903 B2  
(45) Date of Patent: Oct. 14, 2014

(54) METHOD OF MANUFACTURING OPTICAL WAVEGUIDE DEVICE AND OPTICAL WAVEGUIDE DEVICE

(71) Applicant: Fujitsu Limited, Kawasaki (JP)

(72) Inventors: Takatoyo Yamakami, Nagano (JP); Takashi Kubota, Chikuma (JP); Kuniko Ishikawa, Nagano (JP); Hidehiko Kira, Nagano (JP)

(73) Assignee: Fujitsu Limited, Kawasaki (JP)

( * ) Notice: Subject to any disclaimer, the term of this patent is extended or adjusted under 35 U.S.C. 154(b) by 43 days.

(21) Appl. No.: 13/710,670

(22) Filed: Dec. 11, 2012

(65) Prior Publication Data

US 2013/0259421 A1   Oct. 3, 2013

(30) Foreign Application Priority Data

Mar. 30, 2012   (JP) .................... 2012-082178

(51) Int. Cl.
  *G02B 6/12*   (2006.01)
  *B29D 11/00*   (2006.01)
  *G02B 6/122*   (2006.01)

(52) U.S. Cl.
  CPC .... *B29D 11/00721* (2013.01); *B29D 11/00663* (2013.01); *G02B 6/122* (2013.01)
  USPC .......................................................... 385/14

(58) Field of Classification Search
  None
  See application file for complete search history.

(56) References Cited

U.S. PATENT DOCUMENTS

| | | | |
|---|---|---|---|
| 6,516,104 B1 * | 2/2003 | Furuyama | 385/14 |
| 7,042,106 B2 * | 5/2006 | Lu et al. | 257/789 |
| 7,092,603 B2 * | 8/2006 | Glebov et al. | 385/51 |
| 7,239,767 B2 * | 7/2007 | Kim et al. | 385/14 |
| 7,577,323 B2 * | 8/2009 | Iwamori et al. | 385/14 |
| 2002/0037138 A1 | 3/2002 | Kaneko et al. | |
| 2002/0058742 A1 * | 5/2002 | Honda et al. | 524/492 |
| 2004/0067025 A1 * | 4/2004 | Haraguchi et al. | 385/49 |
| 2006/0171627 A1 * | 8/2006 | Aoki et al. | 385/14 |
| 2007/0297729 A1 * | 12/2007 | Kodama et al. | 385/94 |
| 2008/0170819 A1 * | 7/2008 | Kodama et al. | 385/14 |
| 2009/0180732 A1 * | 7/2009 | Takai et al. | 385/14 |
| 2011/0129182 A1 * | 6/2011 | Yamamoto et al. | 385/14 |
| 2011/0286692 A1 * | 11/2011 | Yanagisawa | 385/14 |

FOREIGN PATENT DOCUMENTS

JP   2002-098863 A     4/2002
JP   2006-47764 A   *  2/2006

* cited by examiner

*Primary Examiner* — Mike Stahl
(74) *Attorney, Agent, or Firm* — Squire Patton Boggs (US) LLP (57) ABSTRACT

A method of manufacturing an optical waveguide device, the method includes: inserting an inclined surface of a mold which is inclined relative to a surface of a substrate including an optical waveguide member into a through hole in which the optical waveguide member is exposed from one surface side of the substrate; locating an optical component above an opening of the through hole on the other surface side of the substrate; injecting an underfill material into between the optical component and the other surface and into the through hole; and curing the underfill material to form a mirror surface.

15 Claims, 8 Drawing Sheets

METHOD OF MANUFACTURING OPTICAL WAVEGUIDE DEVICE AND OPTICAL WAVEGUIDE DEVICE

CROSS-REFERENCE TO RELATED APPLICATION(S)

This application is based upon and claims the benefit of priority of the prior Japanese Patent Application No. 2012-82178, filed on Mar. 30, 2012, the entire contents of which are incorporated herein by reference.

FIELD

The embodiments discussed herein are related to a method of manufacturing an optical waveguide device and an optical waveguide device.

BACKGROUND

An optical wiring having effects in flexibility in designing regarding power consumption, transmission distance or speed, communication specification, wiring layout, or electromagnetic noise, a wiring space, or the like is considered to be applied to a supercomputer, a high-performance server, a mobile terminal, or the like.

The related art is disclosed in Japanese Laid-open Patent Publication No. 2002-98863.

SUMMARY

According to one aspect of the embodiments, a method of manufacturing an optical waveguide device, the method includes: inserting an inclined surface of a mold which is inclined relative to a surface of a substrate including an optical waveguide member into a through hole in which the optical waveguide member is exposed from one surface side of the substrate; locating an optical component above an opening of the through hole on the other surface side of the substrate; injecting an underfill material into between the optical component and the other surface and into the through hole; and curing the underfill material to form a mirror surface. The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An optical device such as a vertical cavity surface emitting laser (VCSEL) and a photodiode (PD) or an optical module incorporating an optical device and a control IC (integrated circuit) (hereinafter, they are indicated as "optical component") is mounted in a face-down manner on an electrode provided on an optical waveguide sheet. A mirror of 45 degrees formed within the optical waveguide sheet and the optical axis of a light-emitting portion or light-receiving portion of the optical component are coupled (optically coupled) to each other with high accuracy, and joining of an optical wiring (electrode) is performed.

The method for mounting the optical component may include solder bonding (Controlled Collapse Chip Connection: C4), pressure welding (Non-Conductive Paste: NCP), or ultrasonic bonding. In order to achieve optical coupling between the optical component and the mirror within the optical waveguide sheet, a transparent underfill material having a high light transmittance may be used.

In an optical wiring board, an electric wiring layer and an electrode may be formed on the optical waveguide sheet. The optical waveguide sheet may be mounted on a rigid board or a flexible board. An alignment method for the optical component includes an active alignment in which optical axis adjustment is performed by energizing an optical component, and a passive alignment in which a mirror portion or another alignment mark is recognized and a non-energized optical component is mounted. For mounting the optical component onto the optical wiring board, passive alignment, which is low in cost, may be used.

The optical waveguide sheet may be deformed by heating at component mounting, e.g., heating to 250° C. or less, or by a load at component mounting, e.g., a load of about 30 g/Bump or greater. Thus, the mirror formed within the optical waveguide sheet may be strained and light loss may deteriorate.

Figure 1A:
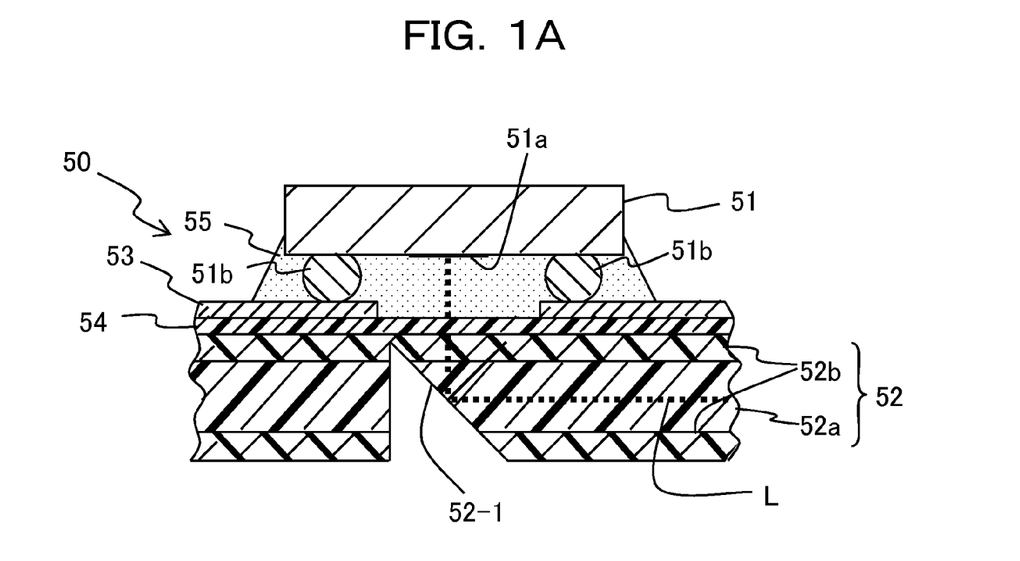
FIGS. 1A and 1B illustrate an exemplary method of manufacturing an optical waveguide device.
Figure 1B:
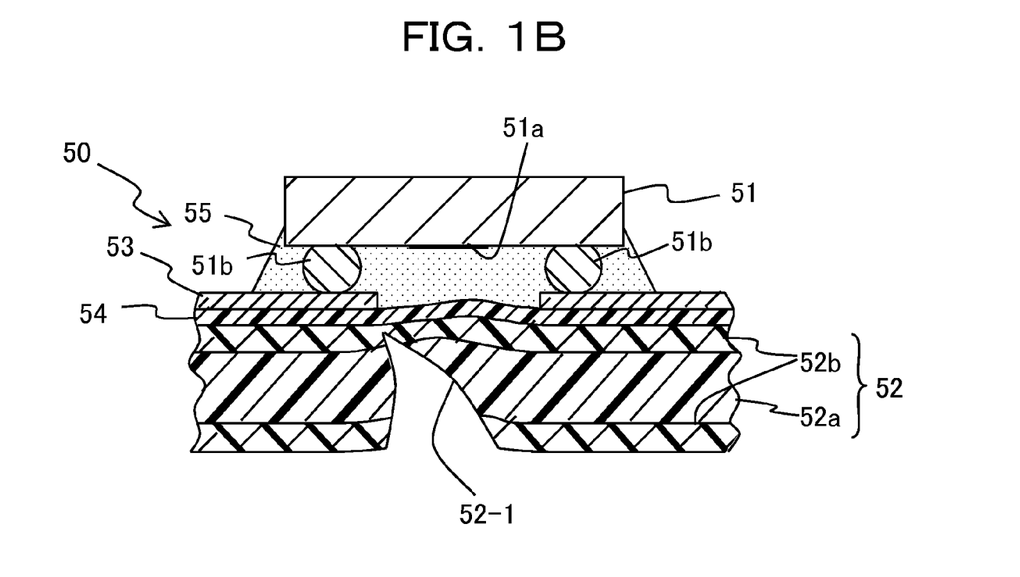

FIGS. 1A and 1B illustrate an exemplary method of manufacturing an optical waveguide device. As illustrated in FIG. 1A, an optical waveguide device 50 includes an optical component 51, a substrate 52, an electric wiring 53, a polyimide film 54, and an underfill material 55.

The optical component 51 includes a light-emitting portion 51a and a plurality of electrodes 51b. The substrate 52 has, for example, a sheet shape (plate shape) and includes optical waveguide members, for example, a plurality of core layers 52a and a clad layer 52b covering the core layers 52a.

The substrate 52 has a cut 52-1 on a bottom surface side in a thickness direction (on a side opposite to an optical component mounting surface). The cut 52-1 may correspond to a mirror surface tilted at, for example, 45 degrees relative to the core layers 52a of the substrate 52. The mirror surface in the cut 52-1 reflects signal light L emitted from the light-emitting portion 51a of the optical component 51, to the core layers 52a.

For example, the substrate 52 may be deformed as illustrated in FIG. 1B, by heating and a load at mounting of the optical component 51. Thus, the cut 52-1 (mirror surface) may be strained and light loss may deteriorate.

A reinforcing resin may be injected to a lower portion of the formed mirror and deformation may be reduced. The cured reinforcing resin may break through the optical waveguide sheet (substrate 52), and an operation of injecting the reinforcing resin may be added.

The mirror may be formed in the optical waveguide sheet by cutting such as laser beam machining or dicing (blade).

When the mirror in the optical waveguide sheet is recognized by an image recognition system within a mounting apparatus, a contrast may not be obtained depending on the specifications of the optical waveguide sheet, and alignment may not be performed. Based on a mounting space, an alignment mark may not be provided circumferentially.

Figure 2:
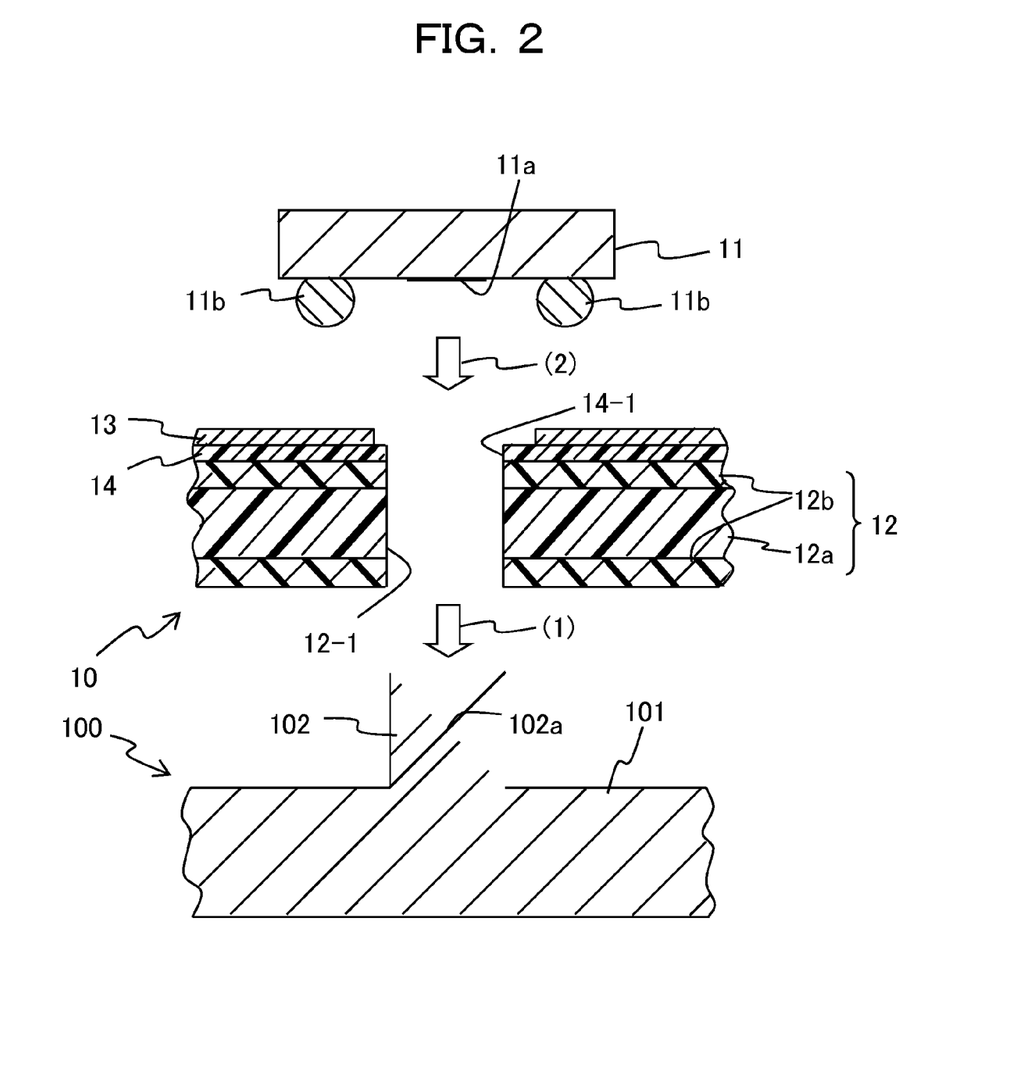
FIGS. 2 to 4 illustrate an exemplary method of manufacturing an optical waveguide device.
Figure 3:
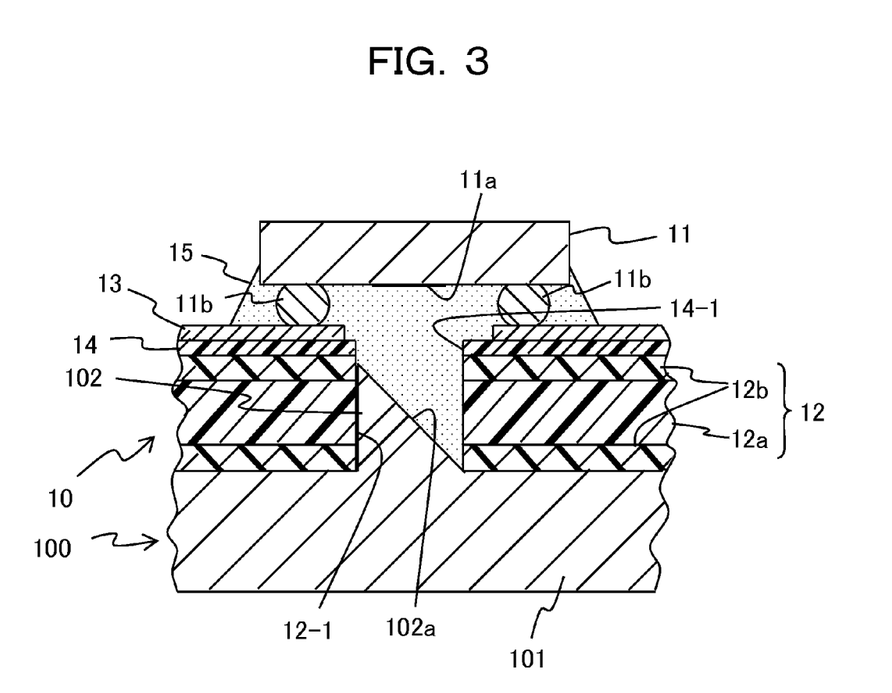
Figure 4:
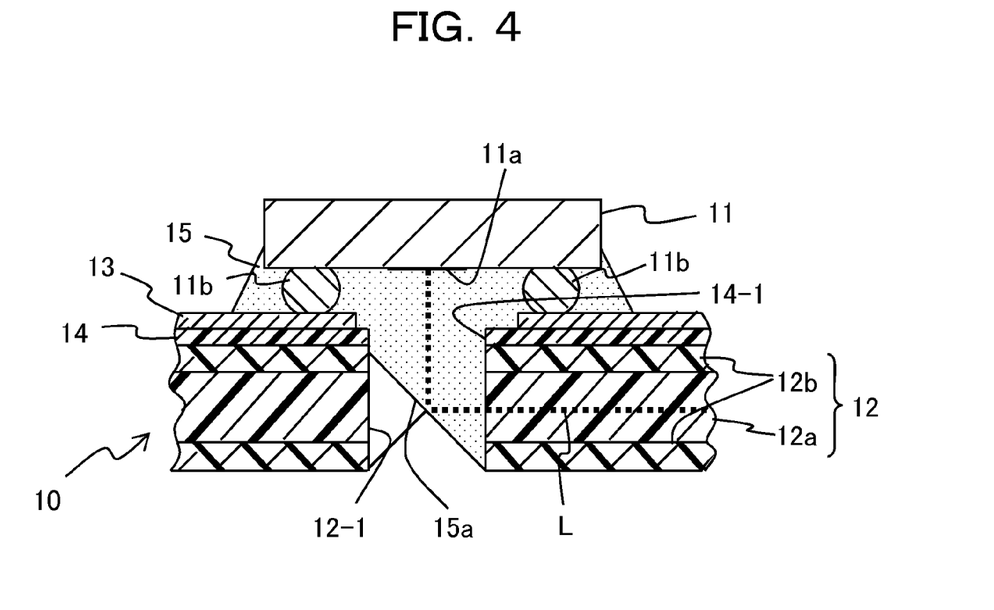

FIGS. 2 to 4 illustrate an exemplary method of manufacturing an optical waveguide device. In FIGS. 2 to 4, cross-sectional views of an optical waveguide device 10 are illustrated.

As illustrated in FIG. 4, the optical waveguide device 10 on which an optical component 11 is mounted includes an optical component 11, a substrate 12, an electric wiring 13, an insulating film such as a polyimide film 14, and an underfill material 15.

The optical component 11 may be an optical device or an optical module incorporating an optical device and a control IC. The optical component 11 may be, for example, a VCSEL, and includes a light-emitting portion 11a and a plurality of electrodes 11b. The optical component 11 may not be a light-emitting device or an optical module incorporating a light-emitting device, and may be a light-receiving device such as a photodiode (PD) or an optical module incorporating a light-receiving device.

The substrate 12 has, for example, a sheet shape (plate shape), and includes optical waveguide members, for example, a plurality of core layers 12a and a clad layer 12b covering the core layers 12a. The core layers 12a have higher refractive indexes than that of the clad layer 12b, and transmit signal light L while totally reflecting the light at a boundary surface with the clad layer 12b.

The electric wiring 13 and the polyimide film 14 are formed on the upper surface (the optical component 11 mounting surface) side of the substrate 12 illustrated in FIGS. 2 to 4. The underfill material 15 may be a transparent resin having a high light transmittance, in order to allow the signal light L transmitted by the core layers 12a of the substrate 12 to pass therethrough. The underfill material 15 may be, for example, an epoxy resin or a urethane resin.

A mold 100 used for manufacturing the optical waveguide device 10 includes a base portion 101 and a projection 102 projecting from the base portion 101. The material of the mold 100 may be, for example, a metal or a ceramic.

The base portion 101 has, a for example, a plate shape extending parallel to the substrate 12. On the base portion 101, the entire substrate 12 may be placed. The mold 100 may be, for example, located on a mounting stage or formed so as to be integrated to the mounting stage.

The projection 102 has an inclined surface 102a formed for transferring a shape to a mirror surface 15a of the underfill material 15. The mirror surface 15a is formed so as to be tilted relative to the surface of the substrate 12, for example, so as to have a tilt of 45 degrees relative thereto.

Figure 5A:
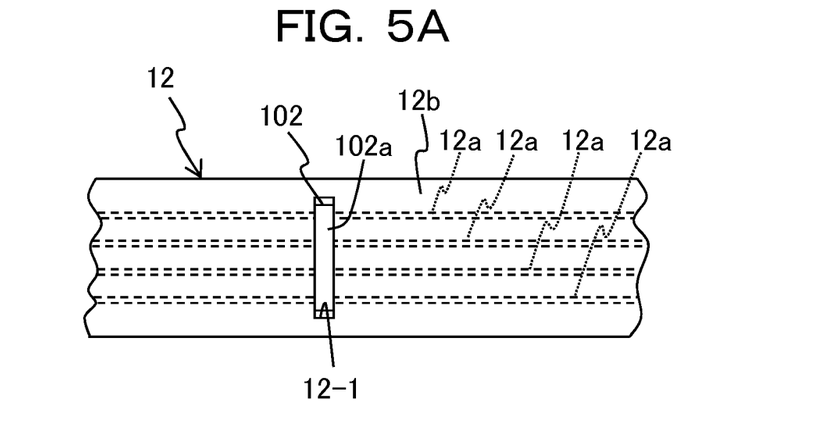
FIGS. 5A to 5C illustrate an exemplary method of manufacturing an optical waveguide device.
Figure 5B:
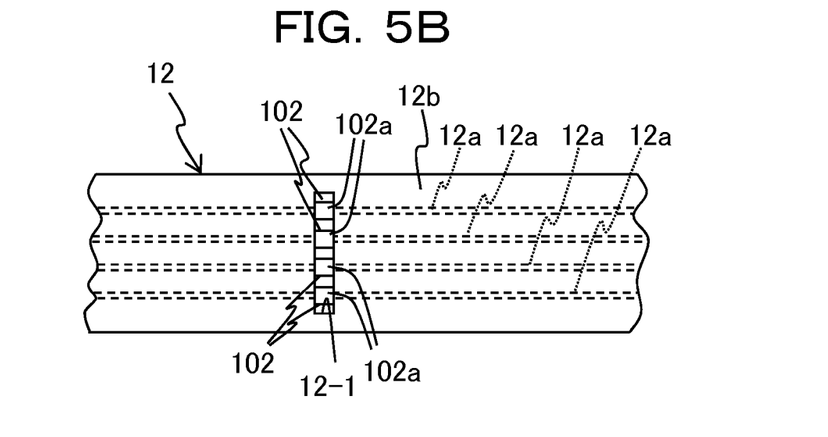
Figure 5C:
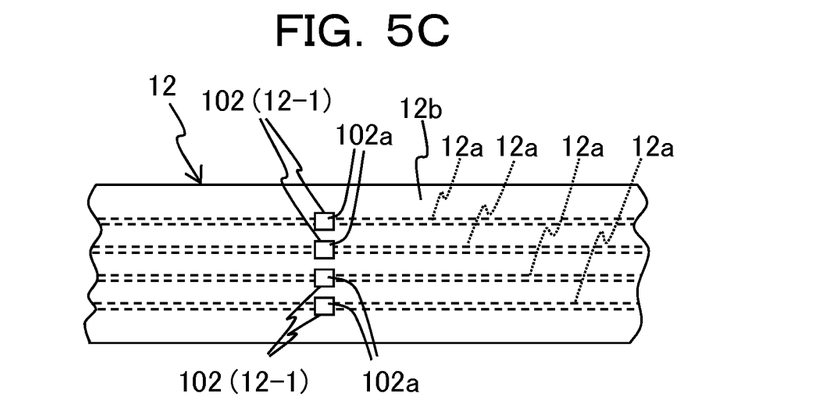

FIGS. 5A to 5C illustrate an exemplary method of manufacturing an optical waveguide device. As illustrated in FIG. 5A, the projection 102 may be formed and inserted such that the inclined surface 102a is located across a plurality of the core layers 12a of the substrate 12. As illustrated in FIG. 5B or 5C, inclined surfaces 102a of a plurality of projections 102 may be formed and inserted so as to be located across a plurality of the core layers 12a of the substrate 12. The mold 100 may be located at each of a plurality of the core layers 12a of the substrate 12.

At least a portion of the inclined surface 102a of the mold 100 may be inserted into a through hole 12-1 of the substrate 12. The mold 100 may not have the base portion 101 and the projection 102. For example, the mold 100 may have a pin shape that is inserted into the through hole 12-1 of the substrate 12.

For example, as illustrated in FIG. 2, through holes 12-1 and 14-1 are formed in the substrate 12 and the polyimide film 14 by, for example, dicing, laser, or the like. Since the through hole 12-1 is formed, the core layers 12a are exposed in the inner wall in the through hole 12-1.

As illustrated in FIG. 5A or 5B, the through hole 12-1 of the substrate 12 or the through hole 14-1 of the polyimide film 14 may be formed in a groove shape so as to extend across a plurality of the core layers 12a of the substrate 12. For example, when the through hole 12-1 is intermittently formed by laser, a plurality of through holes 12-1 may be formed so as to be located at a plurality of the core layers 12a, respectively, as illustrated in FIG. 5C.

The inclined surface 102a formed in the mold 100 may be inserted from one surface side of the substrate 12, for example, from a bottom surface side in FIGS. 2 to 4 or a surface side opposite to the optical component 11 mounting surface (an arrow (1) in FIG. 2). Depending on the shape of the inclined surface 102a, the entirety of the inclined surface 102a may not be inserted into the through hole 12-1, and a portion of the inclined surface 102a may be inserted into the through hole 12-1.

For example, when the substrate 12 is manually or automatically placed relative to the mold 100, the inclined surface 102a may be inserted.

The optical component 11 is located above the opening of the through hole 12-1 on another surface side of the substrate 12, for example, on the upper surface side in FIGS. 2 to 4 (an arrow (2) in FIG. 2). Since the through holes 12-1 and 14-1 are formed in the substrate 12 and the polyimide film 14, the position of the inclined surface 102a of the mold 100, for example, the mounted position of the optical component 11, may be obtained with high accuracy by an image recognition system within a mounting apparatus, for example, a microscope or an imaging device.

As illustrated in FIG. 2, the underfill material 15 is inserted into between the optical component 11 and the other surface of the substrate 12, for example, the upper surface in FIGS. 2 to 4 and into the through hole 12-1, and cured by, for example, heat. For example, as illustrated in FIG. 4, the shape of the inclined surface 102a is transferred to form the mirror surface 15a in the underfill material 15. For example, the mirror surface 15a may be formed so as to have a tilt of, for example, 45 degrees relative to the core layers 12a of the substrate 12.

The underfill material 15 may be injected into the through hole 12-1 prior to locating the optical component 11. Since the underfill material 15 together with the core layers 12a forms a continuous optical path, the position of the inclined surface 102a of the mold 100 may be obtained with high accuracy by the image recognition system.

As illustrated in FIG. 4, the inclined surface 102a of the mold 100 is pulled out from the through hole 12-1. The mirror surface 15a reflects light in a space that occurs by the inclined surface 102a being pulled out.

Figure 6A:
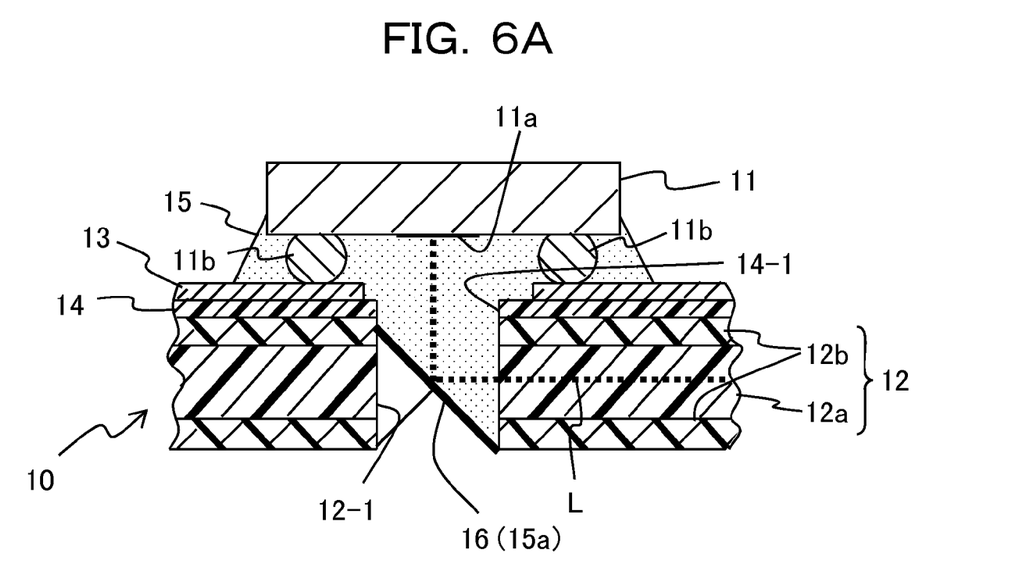
FIGS. 6A and 6B illustrate an exemplary method of manufacturing an optical waveguide device.

FIGS. 6A and 6B illustrate an exemplary method of manufacturing an optical waveguide device. As illustrated in FIG. 6A, a reflection film 16, for example, an Au (gold) film may be formed on the mirror surface 15a by, for example, sputtering. The mirror surface 15a reflects light at the reflection film 16.

Figure 6B:
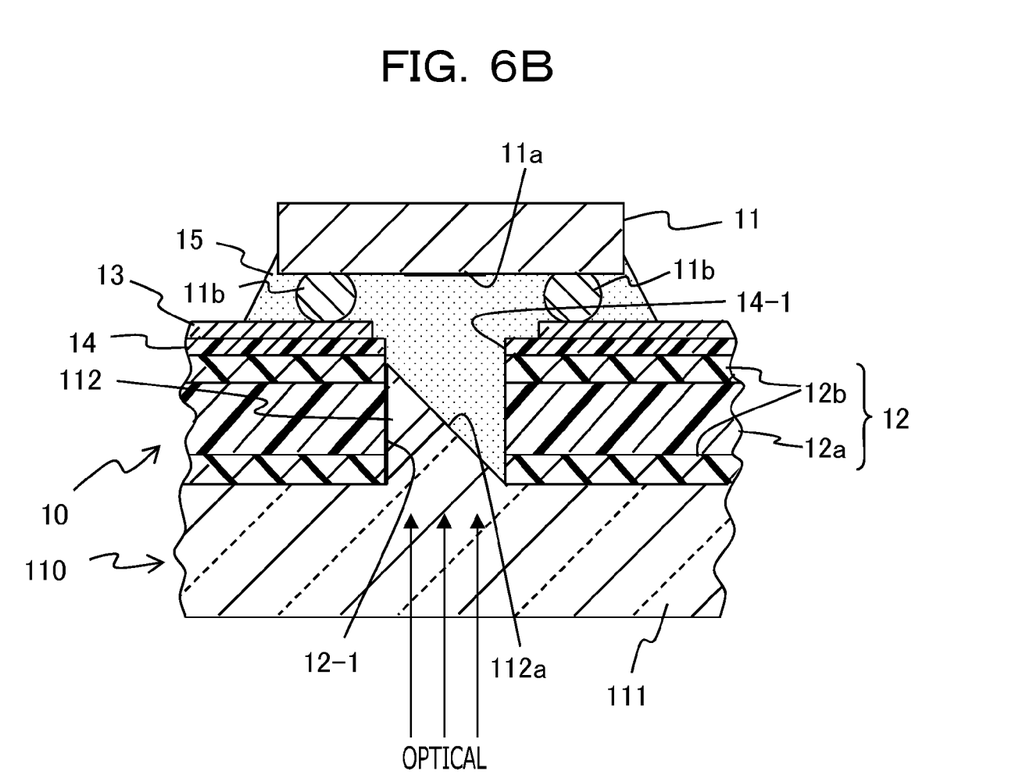

The mold 100 may be made of, for example, a metal or a ceramic. As illustrated in FIG. 6B, a mold 110 may be made of a light-transmissive material, and, for example, the underfill material 15 may be a light-curable resin. Since light, for example, ultraviolet light or visible light, is applied through the mold 110, the underfill material 15 may be cured. When the light transmittance of the mold 110 with respect to the applied light is equal to or greater than 10%, the mold 100 may be light-transmissive. The mold 110 may have a light transmittance of 50% or greater with respect to light for curing the underfill material 15.

When the mold 110 is light-transmissive, the mounted position of the optical component 11 may be obtained from the bottom surface side illustrated in FIG. 6B, for example, from a side opposite to the optical component 11 mounting surface, by the image recognition system. A base portion 111 of the mold 110 and a projection 112 having an inclined surface 112a illustrated in FIG. 6B may have shapes which are substantially the same as or similar to those of the base portion 101 and the projection 102 of the mold 100 illustrated in FIGS. 2 to 4 or FIG. 6A, respectively.

Figure 7:
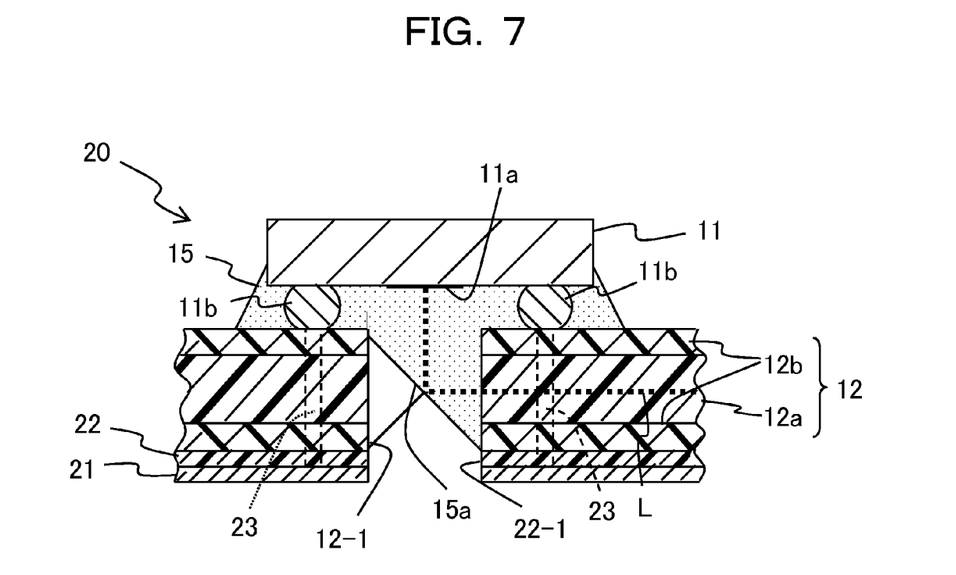
FIG. 7 illustrates an exemplary optical waveguide device.

FIG. 7 illustrates an exemplary optical waveguide device. As in an optical waveguide device 20 illustrated in FIG. 7, an electric wiring 21 and a polyimide film 22 may be located on one surface side of the substrate 12, for example, on a side opposite to the optical component 11 mounting surface. A via 23 may be formed so as to extend through the clad layer 12b of the substrate 12. Based on the aforementioned method and reason, through holes 12-1 and 22-1 may be formed in the substrate 12 and the polyimide film 22.

Figure 8:
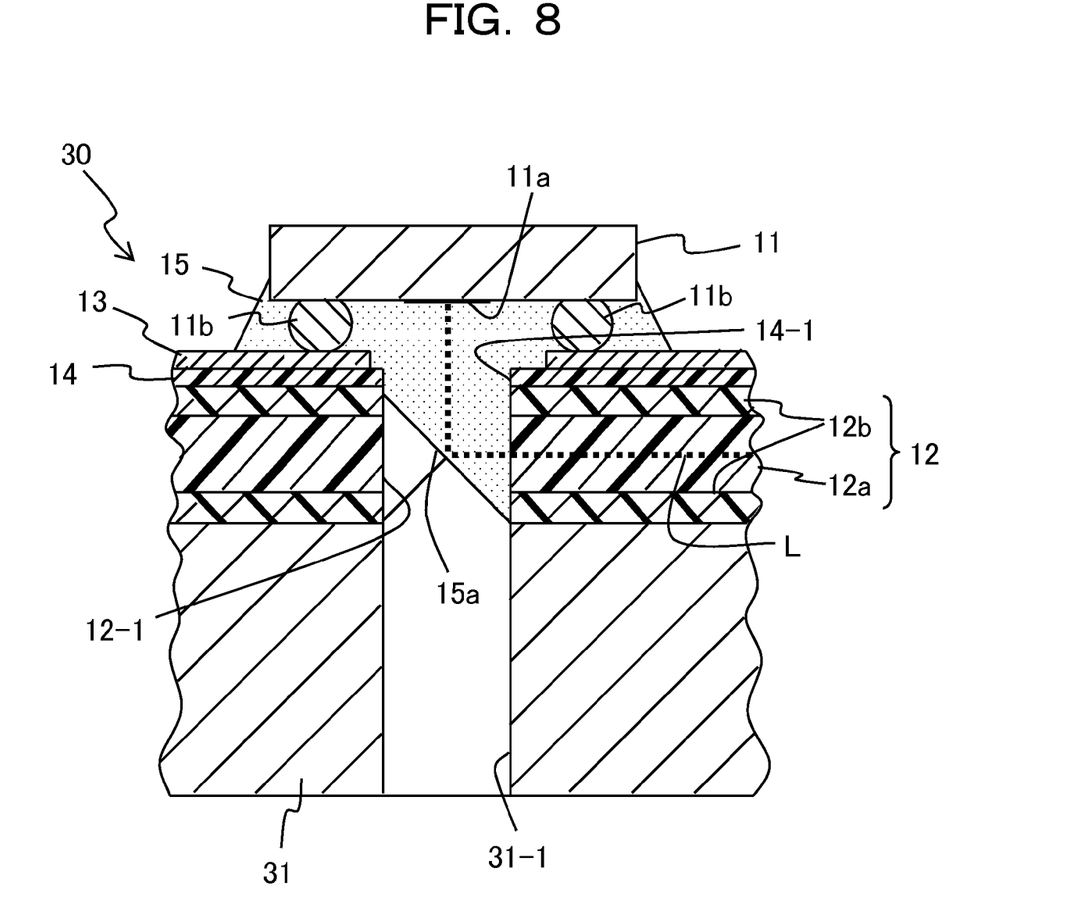
FIG. 8 illustrates an exemplary optical waveguide device.

FIG. 8 illustrates an exemplary optical waveguide device. As in an optical waveguide device 30 illustrated in FIG. 8, the substrate 12 may be located on a board (optical wiring board) 31. A through hole 31-1 is formed in the board 31 so as to communicate with the through hole 12-1 of the substrate 12. The inclined surface 102a of the mold 100 illustrated in FIGS. 2 to 4 is inserted into the through hole 12-1 of the substrate 12 through the through hole 31-1 of the board 31.

An inclined surface 102a of a mold 102 which is inclined relative to the surface of the substrate 12 in which an optical waveguide member, for example, a core layer 12a, is located, is inserted into a through hole 12-1 which is formed in the substrate 12 and in which the core layer 12a is exposed, from one surface side of the substrate 12. The optical component 11 is located above the opening of the through hole 12-1 on the other surface side of the substrate 12, and the underfill material 15 is injected into between the optical component 11 and the other surface and into the through hole 12-1 and cured. The mirror surface 15a for optical coupling between the core layer 12a and the optical component 11 is formed in the underfill material 15.

Since the mirror surface 15a is formed as a result of the injection of the underfill material 15, a cutting process for forming the mirror surface 15a, such as laser beam machining or dicing (blade), may be omitted.

Since the mirror surface 15a is formed as a result of the injection of the underfill material 15, strain that occurs in the mirror surface due to heating or a load at mounting of the optical component 11 may be reduced as compared to the case where a mirror surface is previously formed in the substrate 12.

The mirror surface 15a for optical coupling between the substrate 12 and the optical component 11 may be formed easily with high accuracy.

Since the through hole 12-1 is formed in the substrate 12, the position of the through hole 12-1, the position of the inclined surface 102a inserted into the through hole 12-1, or the mounted position of the optical component 11 may be obtained by the image recognition system or the like at mounting of the optical component 11. Thus, accuracy of mounting the optical component 11 may be improved.

When the underfill material 15 is an epoxy resin or a urethane resin, the signal light L may be reliably transmitted.

Since the mirror surface 15a reflects light in the space that is generated by the inclined surface 102a of the mold 100 being pulled out from the through hole 12-1, the mirror surface 15a may be easily formed.

When the reflection film 16 is formed on the mirror surface 15a as illustrated in FIG. 6A, the signal light L may be reliably transmitted.

Since the through hole 12-1 of the substrate 12 is formed so as to extend across a plurality of optical paths, for example, the core layers 12a as illustrated in FIG. 5A, when the inclined surface 102a is located across a plurality of the core layers 12a, the mirror surface 15a may be easily formed.

Since the through hole 12-1 of the substrate 12 is formed so as to extend across a plurality of the core layers (optical paths) 12a as illustrated in FIG. 5B, when the inclined surfaces 102a of a plurality of the projections 102 are located at a plurality of the core layers (optical paths) 12a, respectively, the mirror surface 15a may be easily formed.

When a plurality of through holes 12-1 of the substrate 12 are formed so as to be located at each of a plurality of the core layers (optical paths) 12a and the inclined surfaces 102a of a plurality of the projections 102 are located at each of a plurality of the core layers (optical paths) 12a, as illustrated in FIG. 5C, the mirror surface 15a may be easily formed.

When the substrate 12 is located on the board 31 and the through hole 31-1 is formed in the board 31 so as to communicate with the through hole 12-1 of the substrate 12 as illustrated in FIG. 8, the mirror surface 15a may be formed easily with high accuracy.

Since at least a portion of the inclined surface 102a of the mold 100 is inserted into the through hole 12-1 as illustrated in FIG. 2, when the optical waveguide substrate 12 is placed on the mold 100, the mirror surface 15a may be easily formed.

When the mold 100 is light-transmissive and the underfill material 15 is a light-curable resin, the underfill material 15 is cured by light applied through the mold as illustrated in FIG. 6B. Thus, the mirror surface 15a may be easily and reliably formed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of manufacturing an optical waveguide device, the method comprising:
    inserting an inclined surface of a mold which is inclined relative to a surface of a substrate including an optical waveguide member into a through hole in which the optical waveguide member is exposed from one surface side of the substrate;
    locating an optical component above an opening of the through hole on the other surface side of the substrate;
    injecting an underfill material into between the optical component and the other surface and into the through hole; and
    curing the underfill material to form a mirror surface.

2. The method according to claim 1, wherein the mirror surface optically couples the optical waveguide member to the optical component.

3. The method according to claim 1, wherein the underfill material is an epoxy resin or a urethane resin.

4. The method according to claim 1, further comprising:
pulling out the inclined surface inserted into the through hole from the through hole after the underfill material is cured; and
forming a reflection film on the mirror surface.

5. The method according to claim 1, wherein
the optical waveguide member includes a plurality of optical paths, and
the through hole is formed so as to extend across the plurality of optical paths.

6. The method according to claim 5, wherein
the mold includes a base portion and a projection which projects from the base portion and in which the inclined surface is formed, and
the inclined surface is inserted into the through hole so as to be located across the plurality of optical paths.

7. The method according to claim 1, wherein
the optical waveguide member includes a plurality of optical paths, and
a plurality of the through holes are formed at each of the plurality of optical paths.

8. The method according to claim 7, wherein
the mold includes a base portion and a plurality of projections which project from the base portion and in each of which the inclined surface is formed, and
the plurality of projections are inserted into the through holes so as to be located at the plurality of corresponding optical paths.

9. The method according to claim 1, wherein
the substrate is located on a board, and
a through hole is formed in the board so as to communicate with the through hole of the optical waveguide member.

10. The method according to claim 1 further comprising, inserting the inclined surface into the through hole when the optical waveguide member is placed on the mold.

11. The method according to claim 1, wherein
the mold is light-transmissive, and
the underfill material is a light-curable resin.

12. The method according to claim 11 further comprising, irradiating light through the mold for curing the underfill material.

13. An optical waveguide device comprising:
a base portion;
an optical waveguide member provided over the base portion and including a through hole;
an optical component mounted above an opening of the through hole on one surface side of the optical component; and
an underfill material injected into between the optical component and the one surface and into the through hole,
wherein the base portion includes an inclined surface relative to the one surface and a projection that projects into the through hole, and the projection is in contact with the underfill material in the through hole via the inclined surface.

14. The optical waveguide device according to claim 13,
wherein the optical waveguide member comprises a stacked layer, the stacked layer comprising a clad layer and a core layer, and
wherein the through hole penetrates through the stacked layer.

15. The optical waveguide device according to claim 14, wherein the inclined surface faces the core layer in the through hole.

* * * * *